Feb. 23, 1932. W. F. SHERMAN 1,846,153
MEANS FOR SYNCHRONIZING DOUBLE CONTACT ARMS OF DISTRIBUTORS
Filed May 16, 1930
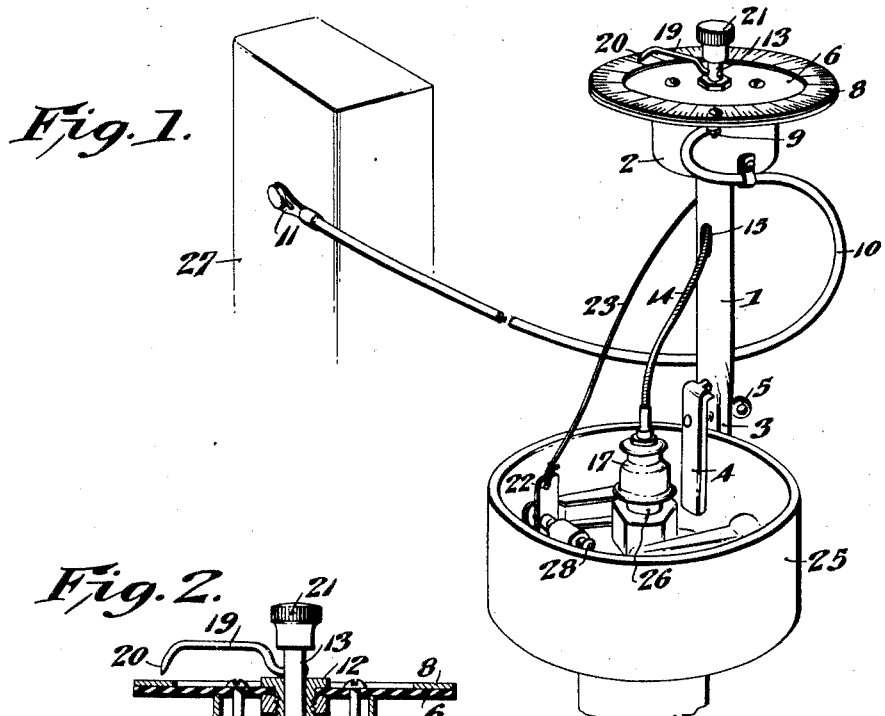
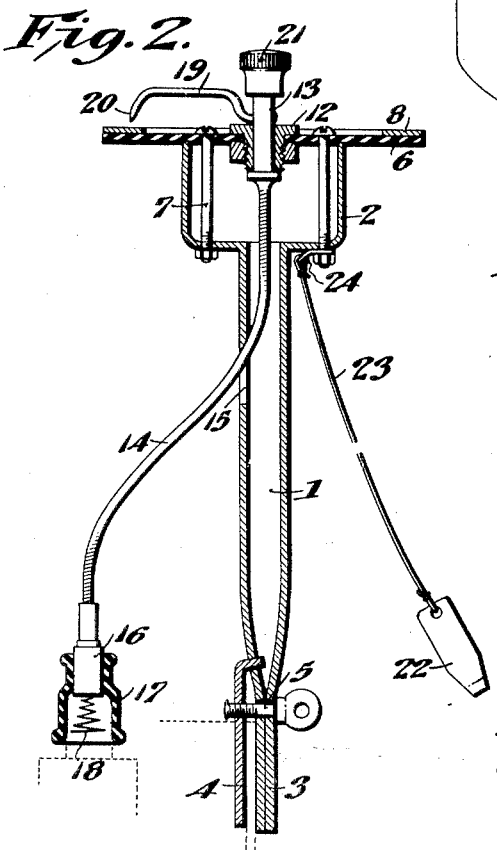
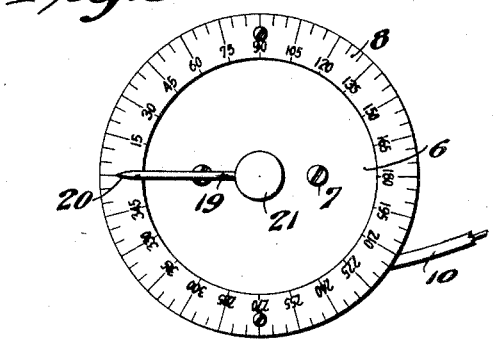
INVENTOR.
William F. Sherman
BY
Lloyd W. Patch
ATTORNEY.

Patented Feb. 23, 1932

1,846,153

UNITED STATES PATENT OFFICE

WILLIAM F. SHERMAN, OF PUEBLO, COLORADO

MEANS FOR SYNCHRONIZING DOUBLE CONTACT ARMS OF DISTRIBUTORS

Application filed May 16, 1930. Serial No. 453,074.

My invention relates to improvements in means for synchronizing double contact arms of distributors, and particularly to an instrument to be connected in the ignition circuit of an automobile or other engine for the perfect checking and synchronizing of double contact arms as now used in many standard distributors.

An object of my invention is to provide a device of this character which is of simple and compact form, to thus be readily handled and used, and which is adaptable to be applied to substantially all makes of distributors to check upon and synchronize the multiple contact arms as now commonly used in connection with multiple cylinder internal combustion engines.

Another object is to provide a tester or instrument of this character which can be used to check upon engines having four, six, eight and twelve or more cylinders, and which will give accurate indications to show whether the spark should be retarded or advanced to synchronize and balance the two distributor arms.

With the above and other objects in view, which will be apparent to those skilled in the art, my invention includes certain novel features of construction and combinations of parts which will be hereinafter pointed out in connection with the drawings.

In the drawings:

Figure 1 is a view in perspective showing my improved instrument and giving a general illustration of the arrangement of the parts to carry out the method.

Fig. 2 is a vertical sectional view through the instrument.

Fig. 3 is a top plan view to better show the indicating dial.

Where the distributor as used in the ignition system of an internal combustion engine employs two contact breaker arms, it is essential to good operation that the two arms be so synchronized that the contact will be broken at closely calculated points during the revolution of the cam or other actuating portion of the distributor, as otherwise the spark plugs would not fire at equally spaced intervals and an inefficient and strained operation of the engine would result. It is the purpose of my invention to visibly indicate the exact instant of firing in connection with each of the contact breaker arms so that the contact points can be adjusted to a fine degree to accomplish firing at the exact interval of greatest efficiency.

The tubular stem 1 has a supporting housing 2 at one end and a flattened clamp portion 3 at its other end, and a movable clamp member 4 is mounted adjacent the clamp portion 3 to be held and tightened into clamping relation by clamp screw 5.

A dial disk 6, of fibre or other insulating material, is mounted upon the distributor housing by means of bolts 7, or other suitable fastenings, and this dial disk has a dial or indicating ring 8 secured on its upper face. The dial or indicating ring is calibrated and marked off preferably to indicate the degrees of a complete circle, although the markings and indications might be calibrated in various other manners and might be indicated in other than figures indicating degree markings. A binding screw 9 connects one end of a high tension wire 10 with this dial ring 8, the wire 10 being extended to any desired length and being preferably provided at its loose end with a connecting clip 11.

Through the insulating dial disk 6 the dial ring 8 is insulated from the supporting housing 2, and a bearing sleeve 12, clamped or otherwise secured centrally within the dial disk 6 is also insulated from the dial ring 8. A pointer shaft 13 is revolubly mounted in bearing sleeve 12 to be substantially in line with the opening of tubular stem 1, and a flexible shaft 14 extends into the bore of the stem and then laterally from the stem through a side opening 15. While the pointer shaft 13 is given a rigid journal mounting through securement of bearing sleeve 12, the flexible shaft 14 extending through the opening 15 allows for connecting pointer shaft 13 to revolve with rotating parts spaced at varying distances from the clamp end 3 of the stem. This flexible shaft 14 has a connector member 16 secured at its loose end, and a friction connecting cup 17, of rubber or other suitable material, is fitted upon the connector member 16 to extend therefrom to receive the end of a distributor shaft or other rotating member to which connection is to be made. A contact spring 18 carried by connector member 16 extends into the connecting cup or cap 17 to insure an unbroken electrical conducting connection from the distributor shaft or other member through connector 16 and flexible shaft 14 to pointer shaft 13.

A pointer 19 is carried by pointer shaft 13 to extend laterally therefrom and is terminated at its outer end in a sparking point 20 adapted to be adjacent to and spaced from the dial ring 8, as best shown in Fig. 2.

If desired, a knob or handle 21, preferably of insulating material, can be placed on the outer end of pointer shaft 13 so that this shaft can be manually rotated or turned to secure any desired adjustment of the parts. A point separating wedge 22, of thin fibre or other suitable insulating material that will resist the passage of high tension currents is shaped to be readily fitted between the contact points of a distributor, and for convenience in use is preferably secured to the instrument by means of a flexible chain or cord 23 which has its remaining end anchored to a clip 24 carried by any suitable portion of the instrument.

In the use of my improved instrument the cover of the distributor will be removed and the clamp portion 3 of the stem 1 will then be placed on the outer side of the distributor case 25, the clamp member 4 being then drawn against the rim of the distributor case by means of the clamp screw 5 to clamp the instrument rigidly in place in substantially upright relation as shown in Fig. 1. The rotor on the end of the distributor shaft 26 is removed and the cap or cup 17 is fitted on the end of the distributor shaft thus exposed, the contact spring 18 insuring a proper electrical connection between the distributor shaft and flexible shaft 14 and consequently to pointer 19. The spark plugs will be removed so that the engine can be readily turned over, and the high tension wire from the distributor to the coil 27 is disconnected, high tension wire 10 being then connected from the instrument to the coil. In the use of my instrument and in carrying out my method the parts will be set up in the manner set forth and the pointer 19 is conductively connected with the distributor shaft 26, which is usually grounded, while the dial ring 8 is connected with the spark coil 27, there being an air gap between the dial ring 8 and the sparking point 20 of the pointer 19. In carrying out my method the movable contact screws for each of the distributor arms will be adjusted to the proper gap or opening recommended by the manufacturer, and which adjustment should theoretically accomplish accurate synchronization between the two distributor arms. The insulating and spacing wedge 22 is then inserted between the contact points to insulate one of the distributor arms, and the engine is turned over by hand. Exactly when the uninsulated distributor arm is opened to separate the contacts a spark will jump from the pointer to the dial ring, and the operator then notes the dial marking thus indicated. The wedge 22 is then withdrawn from between the contact points of the previously insulated distributor arm, and is placed between the contact points at the other distributor arm from which the spark has originated, without disturbing the connection of the flexible shaft 14 with the distributor shaft 26. A mental calculation is then made to divide the calibrations of the dial ring by a number equal to the number of cylinders of the engine controlled by the distributor, and as the engine is again turned by hand the exact instant of sparking between the point 20 and dial ring 8 will be noted. In a perfectly synchronized distributor adjustment this second point of sparking will be exactly at the point on the dial ring indicated by the mental calculation, and if the instant of sparking is at a point in advance of or beyond the calculated indication the contact screw 28 will be adjusted so that the error will be corrected. With the use of my instrument and the carrying out of this method it is possible to check the synchronism to the finest degree and to adjust the parts to substantially perfect operating settings. If it be desired to check back and forth, this can be done by alternating the position of the insulating wedge 22 and continuing the rotation of the engine.

To give a more particular illustration of the use of the instrument, let it be assumed that the distributor to an eight-cylinder internal combustion engine is being checked and synchronized. During the operation of the motor or engine the eight cylinders will each fire once during a single rotation of the distributor shaft, and as a fixed point on the distributor shaft travels through one complete revolution or 360 degrees the circuit will be broken eight times successively, perfect operation requiring that the interval between the points of breaking be one-eight of the complete revolution, or 45 degrees. After the point of sparking of one set of contact points has been found on the calibrated dial ring 8 this is carefully and finally noted. The wedge 22 is then placed between the contacts from which the sparking emanated and, without changing any other connections of the instrument, the engine is turned over to determine the instant of sparking from the second distributor arm. In the present instance, let it be assumed that the initial instant of sparking as indicated on the dial ring be 45 degrees. It is then readily determined that the second spark should be initiated at exactly 90 degrees to insure maximum efficiency of the distributor and consequently of the engine. If the instant of sparking is in advance of or beyond the 90 degree indication on the dial ring, the operator will at once note that the movable contact member must be adjusted forward or back, as the case may be, to correct the error so that the contact points will be opened and the instant of sparking will be exactly at 90 degrees as shown by the dial calibrations on the dial ring.

Where the instrument and method are used in checking upon and synchronizing the distributor of a six-cylinder engine, with the distributor having two arms and a cam with three lobes, the instant of sparking in connection with one of the distributor arms will be calculated at substantially 120 degrees, 240 degrees and 360 degrees, while the instant of sparking of the second distributor arm will be calculated at 60 degrees, 180 degrees and 300 degrees, it being, of course, understood that the same general computations and tests can be made in connection with the distributor of an engine having any number of cylinders.

From the foregoing it will be seen that I have provided an instrument for synchronizing double contact arms of distributors which is of simple and inexpensive construction and which can be readily used by persons without special training or experience; and, that I have provided a method which can be employed to check upon and accurately synchronize the action and operation of two contact breaker arms of a distributor, as used with a multiple cylinder engine having any number of cylinders and having either single or dual ignition.

While I have herein shown and described only certain specific embodiments of my invention, it will be appreciated that changes and variations can be made in the form, construction and arrangement of the parts, and in the steps and procedure in carrying out the method without departing from the spirit and scope of my invention.

I claim:

1. An instrument for synchronizing double contact arms of distributors comprising a supporting structure to be mounted on the distributor, a dial carried by said supporting structure and insulated therefrom, a pointer revolubly mounted to work adjacent the dial and insulated therefrom, means to revolubly and conductively connect said pointer with the distributor shaft, means to connect said dial with the spark coil, and means to selectively separate the contact breaker points of the distributor.

2. An instrument for synchronizing double contact arms of distributors in ignition systems of internal combustion engines comprising a supporting structure to be mounted upon the distributor case, a dial disk of insulating material carried by said supporting structure, a dial ring of conducting material carried by said dial disk, a pointer shaft revolubly mounted in conjunction with the dial disk, a pointer extending from said pointer shaft to terminate adjacent said dial ring and spaced therefrom, means to revolubly and conductively connect said pointer shaft with the distributor shaft, a conducting cable leading from said dial ring to be connected with the spark coil of the ignition system, and means to separate the contact points of the distributor arms.

3. An instrument for checking the operation of distributors comprising, a supporting structure, means to mount said supporting structure adjacent the distributor shaft, a dial carried by said supporting structure and insulated from surrounding parts, a pointer revolubly mounted adjacent to the dial and insulated therefrom, a flexible shaft fitted to said pointer, means to connect said shaft conductively and revolubly with the distributor shaft, means to connect the dial with the other side of the circuit embracing said shaft of the distributor, and means to separate the contact points of the distributor.

In testimony whereof I hereunto affix my signature.

WILLIAM F. SHERMAN.